US012227681B2

(12) United States Patent
Li et al.

(10) Patent No.: US 12,227,681 B2
(45) Date of Patent: Feb. 18, 2025

(54) LAMINATED ARMOR MATERIALS FOR ENHANCED BALLISTIC PROTECTION

(71) Applicants: National Research Council of Canada, Ottawa (CA); HIS MAJESTY THE KING IN RIGHT OF CANADA AS REPRESENTED BY THE MINISTER OF DEFENCE, Ottawa (CA)

(72) Inventors: Chun Li, Ottawa (CA); Saleema Noormohammed, Ottawa (CA); Yadienka Martinez-Rubi, Ottawa (CA); Michael Benson Jakubinek, Ottawa (CA); Behnam Ashrafi, Ottawa (CA); Geneviève Toussaint, Quebec (CA)

(73) Assignees: National Research Council of Canada; His Majesty the King in Right of Canada as Represented by the Minister of Defence, Ottawa (CA)

( * ) Notice: Subject to any disclaimer, the term of this patent is extended or adjusted under 35 U.S.C. 154(b) by 0 days.

(21) Appl. No.: 18/020,765

(22) PCT Filed: Aug. 3, 2021

(86) PCT No.: PCT/CA2021/051081
§ 371 (c)(1),
(2) Date: Feb. 10, 2023

(87) PCT Pub. No.: WO2022/032377
PCT Pub. Date: Feb. 17, 2022

(65) Prior Publication Data
US 2023/0314105 A1    Oct. 5, 2023

Related U.S. Application Data

(60) Provisional application No. 63/064,595, filed on Aug. 12, 2020.

(51) Int. Cl.
C09J 7/10       (2018.01)
B32B 3/14       (2006.01)
(Continued)

(52) U.S. Cl.
CPC ....... C09J 7/10 (2018.01); B32B 3/14 (2013.01); B32B 7/12 (2013.01); B32B 9/005 (2013.01);
(Continued)

(58) Field of Classification Search
CPC ....... C09J 7/10; C09J 7/35; C09J 11/04; C09J 2301/408; C09J 2301/304; B32B 3/14;
(Continued)

(56) References Cited

U.S. PATENT DOCUMENTS 6,989,197 B2    1/2006   Schneider
7,866,248 B2    1/2011   Moore, III et al.
(Continued)

FOREIGN PATENT DOCUMENTS

CA    2782182 A1    6/2011
CN    2406216 Y    11/2000
(Continued)

OTHER PUBLICATIONS

Martinez-Rubi et al. Fabrication of high content carbon nanotube-polyurethane sheets with tailorable properties, ACS Appl. Mater. Interfaces (2017) 9, 36, 30840-30849.

*Primary Examiner* — Samir Abdosh
(74) *Attorney, Agent, or Firm* — SMART & BIGGAR LP; Michael Fenwick (57) ABSTRACT

The present disclosure relates to laminated armor materials for enhanced ballistic protection. In particular, the present disclosure relates to laminated armor materials comprising first and second armor materials and a laminated adhesive layer comprising nanomaterial fillers.

52 Claims, 6 Drawing Sheets

(51) Int. Cl.
  *B32B 7/12*     (2006.01)
  *B32B 9/00*     (2006.01)
  *B32B 9/04*     (2006.01)
  *B32B 17/10*    (2006.01)
  *B32B 27/20*    (2006.01)
  *B32B 27/30*    (2006.01)
  *B32B 27/34*    (2006.01)
  *B32B 27/40*    (2006.01)
  *C09J 7/35*     (2018.01)
  *C09J 11/04*    (2006.01)
  *F41H 5/04*     (2006.01)

(52) U.S. Cl.
  CPC .............. *B32B 9/045* (2013.01); *B32B 17/10* (2013.01); *B32B 27/20* (2013.01); *B32B 27/308* (2013.01); *B32B 27/34* (2013.01); *B32B 27/40* (2013.01); *C09J 7/35* (2018.01); *C09J 11/04* (2013.01); *F41H 5/0407* (2013.01); *F41H 5/0428* (2013.01); *B32B 2250/02* (2013.01); *B32B 2264/10* (2013.01); *B32B 2264/108* (2013.01); *B32B 2307/412* (2013.01); *B32B 2571/02* (2013.01); *C09J 2301/304* (2020.08); *C09J 2301/408* (2020.08); *C09J 2400/126* (2013.01); *C09J 2400/146* (2013.01); *C09J 2433/008* (2013.01); *C09J 2469/008* (2013.01); *C09J 2475/00* (2013.01); *F41H 5/0414* (2013.01); *F41H 5/0442* (2013.01); *F41H 5/0478* (2013.01)

(58) Field of Classification Search
  CPC ........... B32B 7/12; B32B 9/005; B32B 9/045; B32B 17/10; B32B 27/20; B32B 27/308; B32B 27/34; B32B 27/40; B32B 2250/02; F41H 5/0407; F41H 5/0428
  USPC ........................................................ 89/36.02
  See application file for complete search history.

(56) References Cited

U.S. PATENT DOCUMENTS

| | | |
|---|---|---|
| 8,225,704 B2 | 7/2012 | Ogrin |
| 2004/0086706 A1 | 5/2004 | Schneider |
| 2011/0174145 A1 | 7/2011 | Ogrin et al. |
| 2015/0253114 A1 | 9/2015 | Neal |
| 2016/0169633 A1 | 6/2016 | Xu |
| 2017/0363393 A1 | 12/2017 | Ganor |

FOREIGN PATENT DOCUMENTS

| | | | |
|---|---|---|---|
| CN | 104964608 A | 10/2015 | |
| CN | 105333772 A | 2/2016 | |
| KR | 101231616 A | 2/2012 | |
| WO | WO-2013083999 A2 * | 6/2013 | ............ C08J 3/2053 |

* cited by examiner

LAMINATED ARMOR MATERIALS FOR ENHANCED BALLISTIC PROTECTION

CROSS-REFERENCE TO RELATED APPLICATIONS

This application is a U.S. national stage filing under 35 U.S.C. § 371 from International Application No. PCT/CA2021/051081, filed on Aug. 3, 2021 and published as WO2022/032377 on Feb. 17, 2022, which claims the benefit of priority from U.S. patent application No. 63/064,595, filed on Aug. 12, 2020, the benefit of priority of each of which is claimed herein, and which applications and publications are hereby incorporated herein by reference in their entirety.

FIELD

The present disclosure relates to laminated impact resistant materials such as armor materials for enhanced ballistic protection. In particular, the present disclosure relates to laminated impact resistant materials comprising first and second impact resistant materials and a laminated adhesive layer comprising nanomaterial fillers.

INTRODUCTION

Ballistic armor is made with a strike face bonded to a backing panel of various materials. Poor bonding and inadequate energy dissipation at the bond interface between the strike face and the backing can contribute to reduced ballistic capability for both personal and vehicle armor systems. Currently, armor manufacturers achieve ballistic performance by either increasing the thickness of the strike face or by using high performance, lighter ceramic tiles such as boron carbide. However, increasing the thickness of the strike face results in a heavier armor system, while lighter ceramic tiles can be very costly.

SUMMARY

Incorporation of a nanomaterial filler into plies of thermoplastic or thermosetting adhesives such as thermoplastic polyurethane (TPU) and using the resulting material to bond impact resistant material such as ceramic tiles and Kevlar™ plates to obtain a laminated impact resistant material such as a laminated armor material may enhance the shock wave energy transmission between the strike face and the backing face of a ballistic panel made with such laminated impact resistant material such as a laminated armor material, thus increasing ballistic performance and protection.

Accordingly, in one aspect, the present disclosure includes a laminated impact resistant material, comprising
 a) a first impact resistant material;
 b) a second impact resistant material; and
 c) a laminated adhesive layer between the first and second impact resistant materials, wherein the adhesive layer comprises:
  i. a first outer ply adjacent to the first impact resistant material;
  ii. a second outer ply adjacent to the second impact resistant material; and
  iii. one or more interior plies between the first and second outer plies;
wherein the first and second outer plies comprise a first thermoplastic or thermosetting adhesive, and wherein the one or more interior plies comprise a first nanomaterial filler and a second thermoplastic or thermosetting adhesive.

In another aspect, the present disclosure also includes a ballistic panel comprising the laminated impact resistant material of the present disclosure, wherein the first impact resistant material is laminated to the first outer ply of the adhesive layer, and a second impact resistant material is laminated to the second outer ply of the adhesive layer, and wherein one or more interior plies are laminated between the first and second outer plies of the adhesive layer, forming the ballistic panel.

In another aspect, the present disclosure includes a laminated armor material, comprising
 d) a first armor material;
 e) a second armor material; and
 f) a laminated adhesive layer between the first and second armor materials, wherein the adhesive layer comprises:
  iv. a first outer ply adjacent to the first armor material;
  v. a second outer ply adjacent to the second armor material; and
  vi. one or more interior plies between the first and second outer plies;
wherein the first and second outer plies comprise a first thermoplastic or thermosetting adhesive, and wherein the one or more interior plies comprise a first nanomaterial filler and a second thermoplastic or thermosetting adhesive.

In another aspect, the present disclosure also includes a ballistic panel comprising the laminated armor material of the present disclosure, wherein the first armor material is laminated to the first outer ply of the adhesive layer, and a second armor material is laminated to the second outer ply of the adhesive layer, and wherein one or more interior plies are laminated between the first and second outer plies of the adhesive layer, forming the ballistic panel.

In some embodiments, the impact resistant material is an armor material. For example, the laminated impact resistant material is a laminated armor material. For example, the first impact resistant material is a first armor material. For example, the second impact resistant material is a second armor material.

In some embodiments, the first and second outer plies each independently further comprise a second nanomaterial filler at a concentration of about 30 wt % or less than 30 wt % for a thermoplastic adhesive or a concentration of about 1 wt % or less than 1 wt % for a thermosetting adhesive. In some embodiments, the first and second outer plies each independently further comprise a second nanomaterial filler at a concentration of between about 0 wt % to about 30 wt %, or about 0 wt % to about 20 wt %, or about 0 wt % to about 10 wt %.

In some embodiments, at least one of the one or more interior plies has a concentration of first nanomaterial filler higher than the concentration of the second nanomaterial filler in the first and second outer plies.

In some embodiments, all of the plies of the laminated adhesive layer (first outer ply, second outer ply and interior plies) are made of the same adhesive for compatibility and adhesion between the plies. In some embodiments, the plies of the laminated adhesive layer comprise a thermoplastic adhesive. In some embodiments, the plies of the laminated adhesive layer comprise a thermosetting adhesive. It is also contemplated that in some embodiments, the plies of the laminated adhesive layer can comprise both a thermoplastic adhesive and a thermosetting adhesive. For example, it is contemplated that the plies can comprise a thermoplastic and thermosetting adhesive. For example, it is contemplated that the plies can comprise a mixture of one or more thermoplastic adhesives and one or more thermosetting adhesives.

Moreover, it is contemplated that in some embodiments the plies of the laminated adhesive layer may comprise the same or different adhesives. Furthermore, in some embodiments, the plies of the laminated adhesive layer may comprise the same or different nanomaterial fillers.

In addition, it is contemplated that in some embodiments, the laminated adhesive layer may comprise a single layer, in which layer the composition of the adhesive and/or the composition or the concentration of the nanomaterial filler varies along a thickness of the layer spanning between the first and second impact resistant materials. In some embodiments, such variations may comprise a gradual or continuous variation, a stepwise variation, and the like. Furthermore, in some embodiments, the outer portions of the layer abutting or proximate impact resistant materials may have a concentration of nanomaterial fillers that is lower than a corresponding concentration of the nanomaterial fillers in the inner or central portions of the layer distal from the impact resistant materials. Other distributions or concentration gradients of the nanomaterial filler in the layer may also be used.

In some embodiments, the laminated adhesive layer can be produced by 3D-printing.

In some embodiments, the first thermoplastic or thermosetting adhesive and the second thermoplastic or thermosetting adhesive are each independently selected from acrylic, thermoplastic polyurethane (TPU), epoxy, combinations thereof, and the like. In some embodiments, the first thermoplastic or thermosetting adhesive and the second thermoplastic or thermosetting adhesive are TPU. In some embodiments, the thermosetting adhesive is a cured adhesive having irreversible cross-linking which cannot be recycled. In some embodiments, the thermoplastic adhesive is non-cross-linked and can melt and be recycled. In some embodiments, thermoplastic adhesives may have a high molecular weight. The polymer chains in the thermoplastic associate by intermolecular forces, which weaken with increased temperature, yielding a viscous liquid. Examples of thermoplastic adhesives include ethylene-vinyl acetate-based hot-melts popular for crafts, thermoplastic polyurethanes for structural and impact applications, and the like. In some embodiments, thermoset adhesives do not melt when heated, but may decompose and do not reform upon cooling. Examples of thermosetting adhesives include epoxies, thermosetting polyurethanes, cyanoacrylates (or "superglue"), and the like.

In some embodiments, the first nanomaterial filler and the second nanomaterial filler are each independently selected from carbon nanotubes, boron nitride nanotubes, graphene, metal nanoparticles, ceramic nanoparticles, nanopowders, bulk nanostructured materials and combinations thereof. In some embodiments, the nanomaterial filler and the second nanomaterial filler are the same. For example, the first nanomaterial filler and the second nanomaterial filler are carbon nanotubes. In some embodiments, the carbon nanotubes are single-walled and/or multi-walled carbon nanotubes.

In some embodiments, the laminated adhesive layer comprises two or more interior plies. In some embodiments, the laminated adhesive layer comprises three interior plies. In some embodiments, the laminated adhesive layer comprises 3, 4, 5, 6, 7, 8, 9, 10, or more plies.

In some embodiments of the disclosure, the thickness of each ply of the adhesive layer is between about 1 µm to about 2000 µm, between about 1 µm to about 1800 µm, between about 1 µm to about 1500 µm, between about 10 µm to about 1500 µm, between about 100 µm to about 1500 µm, between about 300 µm to about 1500 µm, between about 500 µm to about 1000 µm, between about 500 µm to about 700 µm, about 50 µm, about 70 µm, about 100 µm, about 200 µm, about 250 µm, about 300 µm, about 350 µm, about 400 µm, about 450 µm, about 500 µm, about 600 µm, about 635 µm, about 700 µm, about 800 µm, about 900 µm, about 1000 µm, about 1200 µm, or about 1500 µm. It is contemplated that the thickness of the plies may vary according to the composition of the plies, the amount of material used, or other factors or design parameters. Accordingly, it is contemplated that other thickness may also be used.

In some embodiments of the disclosure, the thickness of the adhesive layer is between about 1 µm to about 10000 µm, between about 1 µm to about 5000 µm, between about 1 µm to about 3000 µm, between about 1 µm to about 2500 µm, between about 1 µm to about 2000 µm, between about 1 µm to about 1500 µm, between about 1 µm to about 1000 µm, between about 100 µm to about 1500 µm, between about 200 µm to about 1500 µm, between about 200 µm to about 1000 µm, between about 300 µm to about 1000 µm, between about 500 µm to about 1000 µm, between about 500 µm to about 700 µm, between about 100 µm to about 500 µm, between about 100 µm to about 300 µm, about 50 µm, about 100 µm, about 150 µm, about 200 µm, about 250 µm, about 300 µm, about 350 µm, about 400 µm, about 500 µm, about 600 µm, about 700 µm, about 800 µm, about 1000 µm, about 1200 µm, about 1500 µm, or about 2000 µm.

In some embodiments, the one or more interior plies each comprise 0 wt % to about 100 wt % or 0 wt % to about 80 wt % of the first nanomaterial filler in a thermoplastic adhesive, or greater than 0 wt % to about 10 wt % of nanomaterial filler in a thermosetting adhesive. Moreover, in some embodiments, the one or more interior plies each comprise about 20 wt % to about 80 wt % of the first nanomaterial filler in a thermoplastic adhesive, or about 0.1 wt % to about 5 wt % of nanomaterial filler in a thermosetting adhesive. In some embodiments, the one or more interior plies each independently comprises about 10 wt % to about 65 wt % of the first nanomaterial filler. In some embodiments, the one or more interior plies each independently comprises about 20 wt % to about 45 wt % of the first nanomaterial filler. In some embodiments, the one or more interior plies each independently comprises about 20 wt % to about 35 wt % of the first nanomaterial filler, or about 35 wt %. In some embodiments, the one or more interior plies comprising the first nanomaterial fillers contain increasing amounts of the filler towards the center ply of the laminated adhesive layer. For example, if the laminated adhesive layer comprises 5 layers, the outer plies contain between about 0-35 wt % of the second nanomaterial filler, while the three interior plies contain optionally higher stepwise amounts of between 0-80 wt % of the first nanomaterial filler.

In some embodiments, one or more of the nanomaterial filler-containing plies may be porous and may contain a volume fraction of voids in the range of about 10 vol. % to about 90 vol. %, in addition to the nanomaterial filler and the adhesive components. Moreover, in some embodiments, one or more of the nanomaterial filler-containing plies may be porous and may contain a volume fraction of voids in the range of about 20 vol. % to about 60 vol. %, in addition to the nanomaterial filler and the adhesive components. Examples of such porous plies may include some forms of CNT-TPU, Buckypaper, nanotube paper, and the like. It is also contemplated that in some embodiments, plies comprising some forms of CNT-TPU, Buckypaper, and nanotube paper may have lower or no porosity. It can be appreciated that when the nanomaterial filler is Buckypaper, nanopaper or the like, some portion or region of the nanomaterial filler-containing plies may not be completely infused or permeated with the adhesive prior to being laminated together. For example, when the nanomaterial filler is Buckypaper, nanopaper, or the like, some regions or portions of the nanomaterial filler-containing plies may be dry prior to being laminated together. However, it can be appreciated that once the nanomaterial filler-containing plies are laminated together, the plies can be substantially completely infused or permeated with the adhesive.

In some embodiments, for example, the laminated adhesive comprises five plies wherein the first and second outer plies contain 0 wt % of the second nanomaterial fillers, and the three interior plies comprise about 35 wt %, 0 wt % and 35 wt % respectively of the first nanomaterial filler.

In some embodiments, the one or more interior plies may contain no more than 5 wt % of the first nanomaterial filler in each ply. In some embodiments, the amount of the first or the second nanomaterial filler may be limited by dispersion of the nanomaterial filler in the first or second thermoplastic or thermosetting adhesive.

In some embodiments, the first and second impact resistant material are each independently selected from ceramic, metal, glass, a polymeric material and fibre reinforced polymer composites. It is contemplated that other material suitable for strike face or back face of ballistic panels may also be used. For example, the fibre reinforced polymer composite can be Kevlar™ reinforced polymer composite, hybrid Kevlar™- and carbon-reinforced polymer composite, carbon fibre polymer composite such as aerospace IM7/8552, or glass fibre polymer composite such as PA66. In some embodiments, the composite polymeric material can be for example plastic, polyester, epoxy, or combinations thereof and the fibres incorporated can be carbon fibres, glass fibres or combinations thereof. In some embodiments, the ceramic is selected from silicon carbide, alumina, boron carbide, silicaton carbide, titanium diboride ceramics and combinations thereof. In some embodiments, the metal is selected from aluminum alloy, steel, titanium alloy, and combinations thereof. Furthermore, in some embodiments, the polymeric material is selected from thermosetting or thermoplastic polymer matrices, which may be used in fibre-reinforced composites, such as synthetic aramid, high-molecular weight polyethylene, ultra-high-molecular weight polyethylene, epoxy, phenolic, bismaleimides (BMI), and the like, and combinations thereof. It is also contemplated that other suitable metals may also be used. For example, the synthetic aramid can be para-aramid. For example, the synthetic aramid can be Kevlar™ Twaron™. For example, the high-molecular weight polyethylene and ultra-high-molecular weight polyethylene can be Dyneema™ or Spectra™. In some embodiments, the first and second impact resistant material is ceramic and/or synthetic aramid.

In some embodiments of the disclosure, the first and second outer plies and the one or more interior plies are laminated, for example as a compacted sandwich. In other words, for example, the first and second outer plies are each laminated to an adjacent interior ply of the one or more interior plies, while the one or more interior plies are each laminated to one or more plies adjacent to each of the one or more interior plies, for example as a compacted sandwich. For example, when a single interior ply is present, the adjacent interior ply for each of the first and second outer plies is the same, and the interior ply is laminated to both the first and second outer plies.

In some embodiments, the first and second impact resistant materials are subjected to a surface treatment. In some embodiments, the surface treatment comprises a plasma treatment, laser treatment, and/or chemical treatment. In some embodiments, the plasma treatment is an atmospheric pressure plasma treatment. In other words, in some embodiments, the first and second impact resistant materials each independently comprise one or more surfaces, wherein at least one such surface abutting the laminated adhesive layer is a treated surface. In some embodiments, the treated surface is plasma treated, laser treated, chemically treated, or combinations thereof. In some embodiments, the treated surface is plasma treated at atmospheric pressure.

In some embodiments, the first impact resistant material serves as a strike face, and the second impact resistant material serves as a back face. In other words, in some embodiments, a surface of the first impact resistant material is configured to be a strike face, and a corresponding surface of the second impact resistant material is configured to be a back face.

In another aspect, it is also provided in the present disclosure a ballistic panel comprising the laminated impact resistant material of the present disclosure, wherein the first impact resistant material is laminated to the first outer ply of the adhesive layer, and a second impact resistant material is laminated to the second outer ply of the adhesive layer, and wherein one or more interior plies are laminated between the first and second outer plies of the adhesive layer.

In some embodiments, the first impact resistant material and the second impact resistant material are independently treated by a surface treatment prior to being laminated respectively to the first outer ply and the second outer ply of the laminated adhesive layer. In some embodiments, the surface treatment for the first and second impact resistant materials are independently selected from a solvent wipe or solvent cleaning, surface abrading, plasma treatment, laser treatment, chemical treatment or combinations thereof. In one embodiment, the plasma treatment is an atmospheric pressure plasma treatment.

In other words, in some embodiments, the first and second impact resistant materials each independently comprise one or more surfaces, wherein at least one such surface contacting the laminated adhesive layer is a treated surface and the at least one such surface is treated prior to contacting the laminated adhesive layer. In some embodiments, the treated surface is plasma treated, laser treated, chemically treated, solvent wiped or cleaned, surface abraded, or combinations thereof. In an embodiment, the treated surface is plasma treated at atmospheric pressure.

In other words, in some embodiments, the first and second impact resistant materials each independently comprise one or more surfaces, wherein at least one such surface contacting the laminated adhesive layer is a treated surface and the at least one such surface is treated prior to contacting the laminated adhesive layer. In some embodiments, the treated surface is plasma treated, laser treated, chemically treated, solvent wiped or cleaned, surface abraded, or combinations thereof. In an embodiment, the treated surface is plasma treated at atmospheric pressure.

Other features and advantages of the present disclosure will become apparent from the following detailed description. It should be understood, however, that the detailed description and the specific examples, while indicating embodiments of the disclosure, are given by way of illustration only and the scope of the claims should not be limited by these embodiments, but should be given the broadest interpretation consistent with the description as a whole.

DRAWINGS

The embodiments of the disclosure will now be described in greater detail with reference to the attached drawings in which:

FIG. 4 shows the ballistic panel prior to the ballistic response testing.

DESCRIPTION OF VARIOUS EMBODIMENTS

I. Definitions

Unless otherwise indicated, the definitions and embodiments described in this and other sections are intended to be applicable to all embodiments and aspects of the present disclosure herein described for which they are suitable as would be understood by a person skilled in the art.

The term "and/or" as used herein means that the listed items are present, or used, individually or in combination. In effect, this term means that "at least one of" or "one or more" of the listed items is used or present.

As used in the present disclosure, the singular forms "a", "an" and "the" include plural references unless the content clearly dictates otherwise. For example, an embodiment including "a compound" should be understood to present certain aspects with one compound, or two or more additional compounds.

In embodiments comprising an "additional" or "second" component, such as an additional or second compound, the second component as used herein may be chemically different from the other components or first component. A "third" component may be different from the other, first, and second components, and further enumerated or "additional" components are similarly different. It is also contemplated that in some embodiments, the first, second, third, and/or additional components may be chemically the same. For example, the first armor material and the second armor material may be the same chemical material. For example, the first thermoplastic or thermosetting adhesive and the second thermoplastic or thermosetting adhesive may be the same thermoplastic or thermosetting adhesive. For example, the first nanomaterial filler and the second nanomaterial filler may be the same nanomaterial filler.

As used in this disclosure and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "consisting" and its derivatives as used herein are intended to be closed terms that specify the presence of the stated features, elements, components, groups, integers, and/or steps, and also exclude the presence of other unstated features, elements, components, groups, integers and/or steps.

The term "consisting essentially of", as used herein, is intended to specify the presence of the stated features, elements, components, groups, integers, and/or steps as well as those that do not materially affect the basic and novel characteristic(s) of these features, elements, components, groups, integers, and/or steps.

The terms "about", "substantially" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies or unless the context suggests otherwise to a person skilled in the art.

The term "SiC" as used herein refers to silicon carbide.

The term "TPU" as used herein refers to thermoplastic polyurethane.

The term "CNT" as used here in refers to carbon nanotube.

The term "laminated" as used herein means that the impact resistant materials such as the armor materials are constructed by stacking the materials or plies in layers to form the laminated material. It is also contemplated that in some embodiments, the materials or plies are not in individual distinct layers or plies but form a gradual or continuous gradient of materials where one or more given properties of the materials or plies change gradually or continuously. For example, the relative amounts of nanomaterial filler and adhesive comprised in the plies of for example the laminated adhesive layer can change gradually or continuously. It is also contemplated that in some embodiments, the plies are individual distinct plies each independently having a distinct relative amount of nanomaterial filler and adhesive.

The term "impact resistant material" as used herein refers to a material that can slow down, stop, neutralize, or lessen at least a portion of the impact of ballistic projectiles such as bullets, shells, shrapnel or fragments. For example, the impact resistant material can slow down, stop, neutralize, or lessen substantially the impact of ballistic projectiles.

The term "nanomaterial filler" as used herein refers to a material having at least one of its dimensions in the nanometer size range and is a generally particulate material. Such particulate materials may include relatively smaller aspect ratio particles such as spheres or near spheres, small aspect ratio polyhedrons or near polyhedrons, and the like. Such particulate materials may also include relatively larger aspect ratio particles such as nano-fibers or nano-fiber fragments, nanotubes, nanorods, and the like.

The term "fibre reinforced polymer composite" as used herein refers to composite polymeric material that incorporates fibrous material to achieve a more desirable characteristic such as greater strength.

The term "thermoplastic adhesive" as used herein refers to polymer materials that melt at an elevated temperature and solidify on cooling to form strong bonds between a wide range of materials.

The term "thermosetting adhesive" as used herein refers to a class of adhesive that cures by means of chemical cross-linking reaction, which forms irreversible chemical bonds.

The term "strike face" as used herein refers to the face of a ballistic panel that is intended to come into contact with a projectile first. The term "back face" as used herein refers to the face of the ballistic panel opposite to the strike face.

II. Laminated Adhesive and Ballistic Panels of the Disclosure

In the present disclosure, it has been demonstrated that incorporating a nanomaterial filler into plies of thermoplastic or thermosetting adhesive such as thermoplastic polyurethane (TPU) and laminating the plies between impact resistant materials to obtain a laminated impact resistant material enhances the shock wave energy transmission between the strike face and the backing face of a ballistic panel, thus increasing ballistic performance and protection.

Accordingly, in one embodiment, the present disclosure includes a laminated impact resistant material, comprising
  a) a first impact resistant material;
  b) a second impact resistant material; and
  c) a laminated adhesive layer between the first and second impact resistant materials, wherein the adhesive layer comprises:
    i. a first outer ply adjacent to the first impact resistant material;
    ii. a second outer ply adjacent to the second impact resistant material; and
    iii. one or more interior plies between the first and second outer plies;
wherein the first and second outer plies comprise a first thermoplastic or thermosetting adhesive, and wherein the one or more interior plies comprise a first nanomaterial filler and a second thermoplastic or thermosetting adhesive.

In some embodiments, the impact resistant material is an armor material. For example, the laminated impact resistant material is a laminated armor material. For example, the first impact resistant material is a first armor material. For example, the second impact resistant material is a second armor material.

In some embodiments, the first and second outer plies each independently further comprise a second nanomaterial filler at a concentration of about 30 wt % or less than 30 wt % for a thermoplastic adhesive or a concentration of about 1 wt % or less than 1 wt % for a thermosetting adhesive. In some embodiments, the first and second outer plies each independently further comprise a second nanomaterial filler at a concentration of between about 0 wt % to about 30 wt %, or about 0 wt % to about 20 wt %, or about 0 wt % to about 10 wt %.

In some embodiments, at least one of the one or more interior plies has a concentration of first nanomaterial filler higher than the concentration of the second nanomaterial filler in the first and second outer plies.

In some embodiments, all of the plies of the laminated adhesive layer (first outer ply, second outer ply and interior plies) are made of the same adhesive for compatibility and adhesion between the plies. In some embodiments, the plies of the laminated adhesive layer comprise a thermoplastic adhesive. In some embodiments, the plies of the laminated adhesive layer comprise a thermosetting adhesive. It is also contemplated that in some embodiments, the plies of the laminated adhesive layer can comprise both a thermoplastic adhesive and a thermosetting adhesive. For example, it is contemplated that the plies can comprise a thermoplastic and thermosetting adhesive. For example, it is contemplated that the plies can comprise a mixture of one or more thermoplastic adhesives and one or more thermosetting adhesives.

Moreover, it is contemplated that in some embodiments the plies of the laminated adhesive layer may comprise the same or different adhesives. Furthermore, in some embodiments, the plies of the laminated adhesive layer may comprise the same or different nanomaterial fillers.

In addition, it is contemplated that in some embodiments, the laminated adhesive layer may comprise a single layer, in which layer the composition of the adhesive and/or the composition or the concentration of the nanomaterial filler varies along a thickness of the layer spanning between the first and second impact resistant materials. In some embodiments, such variations may comprise a gradual or continuous variation, a stepwise variation, and the like. Furthermore, in some embodiments, the outer portions of the layer abutting or proximate impact resistant materials may have a concentration of nanomaterial fillers that is lower than a corresponding concentration of the nanomaterial fillers in the inner or central portions of the layer distal from the impact resistant materials. Other distributions or concentration gradients of the nanomaterial filler in the layer may also be used.

In some embodiments, the laminated adhesive layer can be produced by 3D-printing.

In some embodiments, the first thermoplastic or thermosetting adhesive and the second thermoplastic or thermosetting adhesive are each independently selected from acrylic, thermoplastic polyurethane (TPU), epoxy, combinations thereof, and the like. In some embodiments, the first thermoplastic or thermosetting adhesive and the second thermoplastic or thermosetting adhesive are TPU. In some embodiments, the thermosetting adhesive is a cured adhesive having irreversible cross-linking which cannot be recycled. In some embodiments, the thermoplastic adhesive is non-cross-linked and can melt and be recycled. In some embodiments, thermoplastic adhesives may have a high molecular weight. The polymer chains in the thermoplastic associate by intermolecular forces, which weaken with increased temperature, yielding a viscous liquid. Examples of thermoplastic adhesives include ethylene-vinyl acetate-based hot-melts popular for crafts, thermoplastic polyurethanes for structural and impact applications, and the like. In some embodiments, thermoset adhesives do not melt when heated, but may decompose and do not reform upon cooling. Examples of thermosetting adhesives include epoxies, thermosetting polyurethanes, cyanoacrylates (or "superglue"), and the like.

In some embodiments, the first nanomaterial filler and the second nanomaterial filler are each independently selected from carbon nanotubes, boron nitride nanotubes, graphene, metal nanoparticles, ceramic nanoparticles, nanopowders, bulk nanostructured materials and combinations thereof. In some embodiments, the nanomaterial filler and the second nanomaterial filler are the same. For example, the first nanomaterial filler and the second nanomaterial filler are carbon nanotubes. In some embodiments, the carbon nanotubes are single-walled and/or multi-walled carbon nanotubes.

In some embodiments, the laminated adhesive layer comprises two or more interior plies. In some embodiments, the laminated adhesive layer comprises three interior plies. In some embodiments, the laminated adhesive layer comprises 3, 4, 5, 6, 7, 8, 9, 10, or more plies.

In some embodiments of the disclosure, the thickness of each ply of the adhesive layer is between about 1 µm to about 2000 µm, between about 1 µm to about 1800 µm, between about 1 µm to about 1500 µm, between about 10 µm to about 1500 µm, between about 100 µm to about 1500 µm, between about 300 µm to about 1500 µm, between about 500 µm to about 1000 µm, between about 500 µm to about 700 µm, about 50 µm, about 70 µm, about 100 µm, about 200 µm, about 250 µm, about 300 µm, about 350 µm, about 400 µm, about 450 µm, about 500 µm, about 600 µm, about 635 µm, about 700 µm, about 800 µm, about 900 µm, about 1000 µm, about 1200 µm, or about 1500 µm. It is contemplated that the thickness of the plies may vary according to the composition of the plies, the amount of material used, or other factors or design parameters. Accordingly, it is contemplated that other thickness may also be used.

In some embodiments of the disclosure, the thickness of the adhesive layer is between about 1 µm to about 10000 µm, between about 1 µm to about 5000 µm, between about 1 µm to about 3000 µm, between about 1 µm to about 2500 µm, between about 1 µm to about 2000 µm, between about 1 µm to about 1500 µm, between about 1 µm to about 1000 µm, between about 100 µm to about 1500 µm, between about 200 µm to about 1500 µm, between about 200 µm to about 1000 µm, between about 300 µm to about 1000 µm, between about 500 µm to about 1000 µm, between about 500 µm to about 700 µm, between about 100 µm to about 500 µm, between about 100 µm to about 300 µm, about 50 µm, about 100 µm, about 150 µm, about 200 µm, about 250 µm, about 300 µm, about 350 µm, about 400 µm, about 500 µm, about 600 µm, about 700 µm, about 800 µm, about 1000 µm, about 1200 µm, about 1500 µm, or about 2000 µm.

In some embodiments, the one or more interior plies each comprise 0 wt % to about 100 wt % or 0 wt % to about 80 wt % of the first nanomaterial filler in a thermoplastic adhesive, or greater than 0 wt % to about 10 wt % of nanomaterial filler in a thermosetting adhesive. Moreover, in some embodiments, the one or more interior plies each comprise about 20 wt % to about 80 wt % of the first nanomaterial filler in a thermoplastic adhesive, or about 0.1 wt % to about 5 wt % of nanomaterial filler in a thermosetting adhesive. In some embodiments, the one or more interior plies each independently comprises about 10 wt % to about 65 wt % of the first nanomaterial filler. In some embodiments, the one or more interior plies each independently comprises about 20 wt % to about 45 wt % of the first nanomaterial filler. In some embodiments, the one or more interior plies each independently comprises about 20 wt % to about 35 wt % of the first nanomaterial filler, or about 35 wt %. In some embodiments, the one or more interior plies comprising the first nanomaterial fillers contain increasing amounts of the filler towards the center ply of the laminated adhesive layer. For example, if the laminated adhesive layer comprises 5 layers, the outer plies contain between about 0-35 wt % of the second nanomaterial filler, while the three interior plies contain optionally higher stepwise amounts of between 0-80 wt % of the first nanomaterial filler.

In some embodiments, one or more of the nanomaterial filler-containing plies may be porous and may contain a volume fraction of voids in the range of about 10 vol. % to about 90 vol. %, in addition to the nanomaterial filler and the adhesive components. Moreover, in some embodiments, one or more of the nanomaterial filler-containing plies may be porous and may contain a volume fraction of voids in the range of about 20 vol. % to about 60 vol. %, in addition to the nanomaterial filler and the adhesive components. Examples of such porous plies may include some forms of CNT-TPU, Buckypaper, nanotube paper, and the like. It is also contemplated that in some embodiments, plies comprising some forms of CNT-TPU, Buckypaper, and nanotube paper may have lower or no porosity. It can be appreciated that when the nanomaterial filler is Buckypaper, nanopaper or the like, some portion or region of the nanomaterial filler-containing plies may not be completely infused or permeated with the adhesive prior to being laminated together. For example, when the nanomaterial filler is Buckypaper, nanopaper, or the like, some regions or portions of the nanomaterial filler-containing plies may be "dry" prior to being laminated together. However, it can be appreciated that once the nanomaterial filler-containing plies are laminated together, the plies can be partially, substantially, or completely infused or permeated with the adhesive.

In some embodiments, for example, the laminated adhesive comprises five plies wherein the first and second outer plies contain 0 wt % of the second nanomaterial fillers, and the three interior plies comprise about 35 wt %, 0 wt % and 35 wt % respectively of the first nanomaterial filler.

In some embodiments, the one or more interior plies may contain no more than 5 wt % of the first nanomaterial filler in each ply. In some embodiments, the amount of the first or the second nanomaterial filler may be limited by dispersion of the nanomaterial filler in the first or second thermoplastic or thermosetting adhesive.

In some embodiments, the first and second impact resistant material are each independently selected from ceramic, metal, glass, a polymeric material and fibre reinforced polymer composites. It is contemplated that other material suitable for strike face or back face of ballistic panels may also be used. For example, the fibre reinforced polymer composite can be Kevlar™ reinforced polymer composite, hybrid Kevlar™- and carbon-reinforced polymer composite, carbon fibre polymer composite such as aerospace IM7/8552, or glass fibre polymer composite such as PA66. In some embodiments, the composite polymeric material can be for example plastic, polyester, epoxy, or combinations thereof and the fibres incorporated can be carbon fibres, glass fibres or combinations thereof. In some embodiments, the ceramic is selected from silicon carbide, alumina, boron carbide, silicaton carbide, titanium diboride ceramics and combinations thereof. In some embodiments, the metal is selected from aluminum alloy, steel, titanium alloy, and combinations thereof. Furthermore, in some embodiments, the polymeric material is selected from thermosetting or thermoplastic polymer matrices, which may be used in fibre-reinforced composites, such as synthetic aramid, high-molecular weight polyethylene, ultra-high-molecular weight polyethylene, epoxy, phenolic, bismaleimides (BMI), and the like, and combinations thereof. It is also contemplated that other suitable metals may also be used. For example, the synthetic aramid can be para-aramid. For example, the synthetic aramid can be Kevlar™ Twaron™. For example, the high-molecular weight polyethylene and ultra-high-molecular weight polyethylene can be Dyneema™ or Spectra™. In some embodiments, the first and second impact resistant material is ceramic and/or synthetic aramid.

In some embodiments of the disclosure, the first and second outer plies and the one or more interior plies are laminated, for example as a compacted sandwich. In other words, for example, the first and second outer plies are each laminated to an adjacent interior ply of the one or more interior plies, while the one or more interior plies are each laminated to one or more plies adjacent to each of the one or more interior plies, for example as a compacted sandwich. For example, when a single interior ply is present, the adjacent interior ply for each of the first and second outer plies is the same, and the interior ply is laminated to both the first and second outer plies.

In some embodiments, the first and second impact resistant materials are subjected to a surface treatment. In some embodiments, the surface treatment comprises a plasma treatment, laser treatment, and/or chemical treatment. In some embodiments, the plasma treatment is an atmospheric pressure plasma treatment. In other words, in some embodiments, the first and second impact resistant materials each independently comprise one or more surfaces, wherein at least one such surface abutting the laminated adhesive layer is a treated surface. In some embodiments, the treated surface is plasma treated, laser treated, chemically treated, or combinations thereof. In some embodiments, the treated surface is plasma treated at atmospheric pressure.

In some embodiments, the first impact resistant material serves as a strike face, and the second impact resistant material serves as a back face. In other words, in some embodiments, a surface of the first impact resistant material is configured to be a strike face, and a corresponding surface of the second impact resistant material is configured to be a back face.

In another aspect, it is also provided in the present disclosure a ballistic panel comprising the laminated impact resistant material of the present disclosure, wherein the first impact resistant material is laminated to the first outer ply of the adhesive layer, and a second impact resistant material is laminated to the second outer ply of the adhesive layer, and wherein one or more interior plies are laminated between the first and second outer plies of the adhesive layer.

In some embodiments, the first impact resistant material and the second impact resistant material are independently treated by a surface treatment prior to being laminated respectively to the first outer ply and the second outer ply of the laminated adhesive layer. In some embodiments, the surface treatment for the first and second impact resistant materials are independently selected from a solvent wipe or solvent cleaning, surface abrading, plasma treatment, laser treatment, chemical treatment or combinations thereof. In one embodiment, the plasma treatment is an atmospheric pressure plasma treatment.

In other words, in some embodiments, the first and second impact resistant materials each independently comprise one or more surfaces, wherein at least one such surface contacting the laminated adhesive layer is a treated surface and the at least one such surface is treated prior to contacting the laminated adhesive layer. In some embodiments, the treated surface is plasma treated, laser treated, chemically treated, solvent wiped or cleaned, surface abraded, or combinations thereof. In an embodiment, the treated surface is plasma treated at atmospheric pressure.

In other words, in some embodiments, the first and second impact resistant materials each independently comprise one or more surfaces, wherein at least one such surface contacting the laminated adhesive layer is a treated surface and the at least one such surface is treated prior to contacting the laminated adhesive layer. In some embodiments, the treated surface is plasma treated, laser treated, chemically treated, solvent wiped or cleaned, surface abraded, or combinations thereof. In an embodiment, the treated surface is plasma treated at atmospheric pressure.

Figure 2:
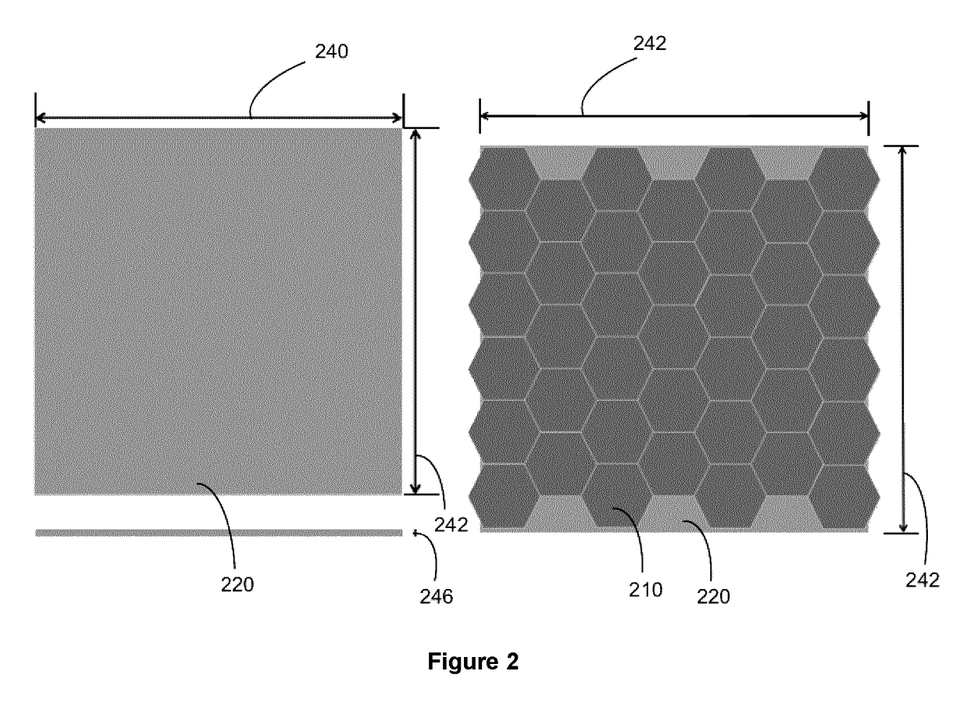
FIG. 2 shows a schematic illustrating an exemplary ceramic-based armor system with ceramic tiles as the striking face bonded to a back face such as Kevlar™.

Referring to FIG. 2, a schematic representation is shown of an exemplary embodiment of a design of an example ballistic panel. The ballistic panel comprises a first impact resistant material 210 and a second impact resistant material 220. The first impact resistant material 210 and the second impact resistant material 220 can comprise any material suitable for a strike face or a back face of a ballistic panel. In some embodiments, the first impact resistant material 210 and the second impact resistant material 220 are each independently selected from ceramic, metal, glass, polymeric material and fibre reinforced polymer composites. In the illustrated example, the first impact resistant material 210 comprises ceramic tiles in hexagonal shapes, and the second impact resistant material 220 comprises Kevlar™ sheets. As exemplified in FIG. 2, the hexagonal ceramic tiles can be adhesively bonded together and can be adhesively bonded to the second impact resistant material 220. As exemplified in FIG. 2, gaps between the hexagonal shapes can be bondlines. As exemplified in FIG. 2, the second impact resistant material 220 can have dimensions of a width 240, a length of 242, and a thickness 246. The dimensions of width 240, length 242, and thickness 246 can be determined according to the design parameters and the intended application of the ballistic panel.

Figure 3:
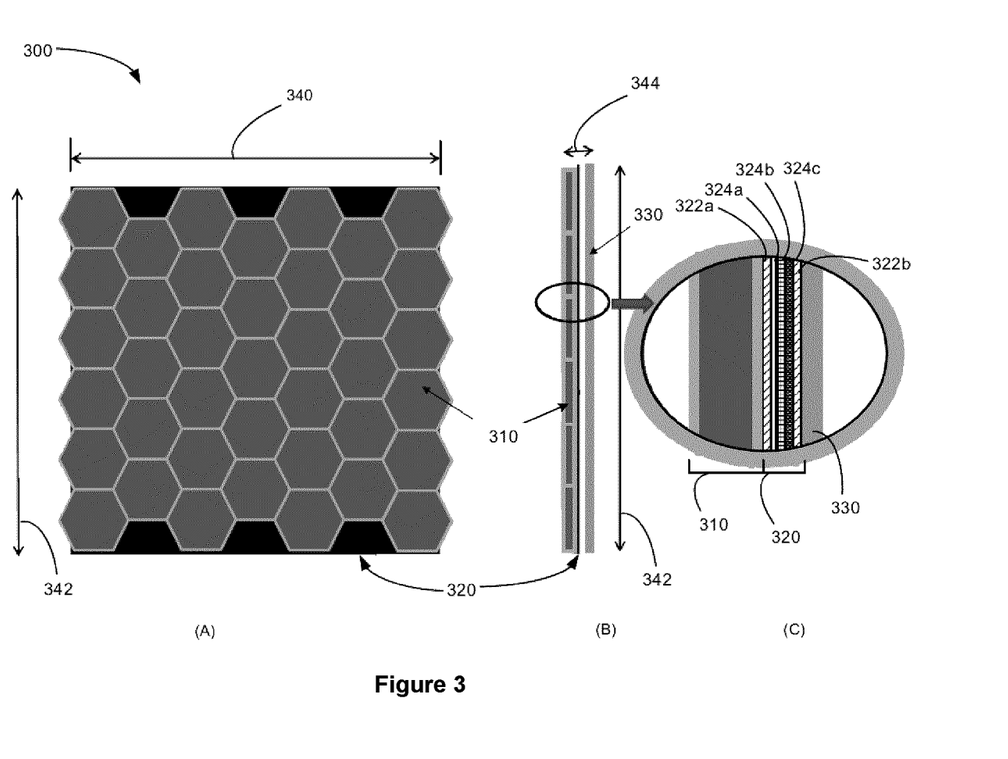
FIG. 3 shows a schematic illustrating an exemplary ballistic panel with ceramic tile as striking face, and Kevlar™ panel as back face bonded with the laminated adhesive with five plies of the present disclosure.

Referring to FIG. 3, a schematic representation is shown of an exemplary embodiment of a laminated impact resistant material 300 of the present disclosure. The laminated impact resistant material 300 comprises a first impact resistant material 310, a second impact resistant material 330, and a laminated adhesive layer 320 between the first impact resistant material 310 and the second impact resistant material 330. The first impact resistant material 310 and the second impact resistant material 330 can comprise any material suitable for a strike face or a back face of a ballistic panel. In some embodiments, the first impact resistant material 310 and the second impact resistant material 330 are each independently selected from ceramic, metal, glass, polymeric material and fibre reinforced polymer composites. In the illustrated example, the first impact resistant material 310 comprises ceramic tiles in hexagonal shapes, and the second impact resistant material 330 comprises Kevlar™ sheets. As exemplified in FIG. 3, gaps between the hexagonal shapes can be bondlines or air gap. In the illustrated example, the second impact resistant material 330 can have dimensions of a width of 340, and a length of 342. The dimensions of width 340 and length 342 can be determined according to the design parameters and the intended application of the ballistic panel.

As exemplified in FIG. 3, the laminated adhesive layer 320 can comprise a first outer ply 322a and a second outer ply 322b. One or more interior plies 324a, 324b, and 324c (collectively or generically referred to as interior plies 324) can be between the first outer ply 322a and the second outer ply 322b. In the illustrated example of FIG. 3, three interior plies 324a, 324b, and 324c are shown between the first outer ply 322a and the second outer ply 322b. It can be appreciated that the number of interior plies can be fewer or more than the three interior plies shown in FIG. 3. It is also contemplated that in some embodiments, the impact resistant material need not comprise an interior ply, in which case the first outer play may be abutting the second outer ply. It is also contemplated that in some embodiments, the laminated adhesive layer can comprise one single layer, where the composition of the adhesive and/or the composition or concentration of the nanomaterial filler varies gradually or substantially continuously along the thickness of the layer spanning between the first impact resistant material 310 and the second impact resistant material 330. As exemplified in FIG. 3(D), the laminated adhesive layer 350 comprises one single layer.

As exemplified in FIG. 3, the first impact resistant material 310 can be laminated to the first outer ply 322a of the laminated adhesive layer 320. Similarly, the second impact resistant material 330 can be laminated to the second outer ply 322b of the laminated adhesive layer 320. The first outer ply 322a and the second outer ply 322b can be laminated to an adjacent interior ply. As exemplified in FIG. 3, the first outer ply 322a is laminated to the interior ply 324a, which is adjacent to the first outer ply 322a. Similarly, as exemplified in FIG. 3, the second outer ply 322b is laminated to the interior ply 324c, which is adjacent to the second outer ply 322b. The one or more interior plies 324 can be each laminated to the one or more interior plies abutting each of the one or more interior plies. In the illustrated example of FIG. 3, the interior ply 324a is laminated to the abutting interior ply 324b, which is in turn laminated to both the adjacent interior plies 324a and 324c.

Now referring to the illustrated embodiment of FIG. 3(D), where the laminated adhesive layer 350 is one single layer, it is envisioned that the laminated adhesive layer 350 can be laminated or applied directly on the first impact resistant material 310 and the second impact resistant material 330.

As exemplified in FIG. 3, the laminated impact resistant material 300 of the present disclosure can have a thickness 344. It can be appreciated that the thickness 344 may vary depending on the structure and dimensions of the first impact resistant material 310 and the second impact resistant material 330, and on the laminated adhesive layer 320 or 350. For example, the thickness 344 can vary depending on the number of plies present in the laminated adhesive layer 320 and/or the composition of the plies of the laminated adhesive layer 320. For example, the thickness 344 can vary depending on the thickness of the laminated adhesive layer 350 and/or the composition of the laminated adhesive layer 350.

As exemplified in FIG. 3, when the laminated impact resistant material 300 is a ballistic panel, the outer surface of the first impact resistant material 310 can be configured to be a strike face, while the surface opposite to the outer surface of the first impact resistant material 310, for example the outer surface of the second impact resistant material 330, can be configured to be the back face.

EXAMPLES

The following non-limiting examples are illustrative of the present disclosure.

General Methods

The thermoplastic polyurethane Dureflex™ A4700 (Covestro, Germany) and NC7000™ industrial grade multi-walled carbon nanotubes (CNTs) from Nanocyl SA (Belgium) were combined via a one-step filtration method to fabricate individual nanomodified adhesive plies. CNT dispersions were obtained using a flow-through tip sonicator, a bath sonicator (Fisher Scientific FS110) and a horn sonication (Branson Sonifier 250, 30% output, 50% duty cycle).

Example 1 Manufacture of Ballistic Panel

Figure 1:
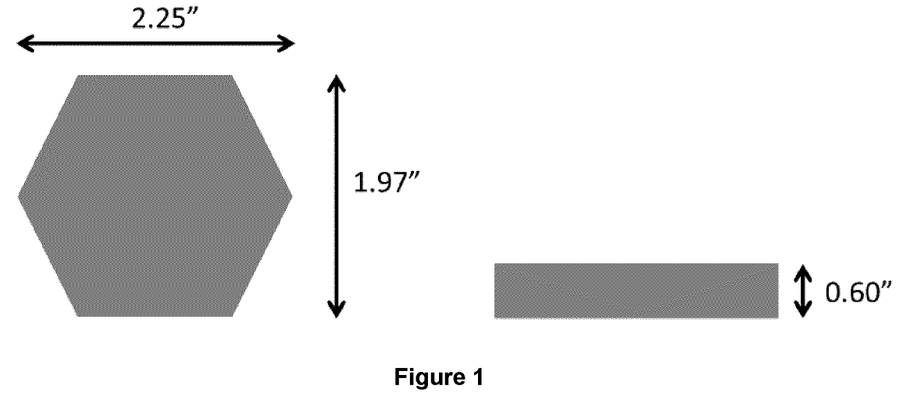
FIG. 1 shows a schematic illustrating an exemplary silicon carbide (SiC) tile.

Ceramic tiles were made from Silicon Carbide (SiC). The dimensions of the tiles are shown in FIG. 1. Each tile had a bulk density of 3.21 g/cm$^3$ and weighed approximately 102 g. The fracture toughness for this grade of SiC is 2.94 MPa m$^{1/2}$ and its Vickers hardness is 2800.

Kevlar™ sheet was made from 6 plies ([0]$_6$). Each ply was a cross-plied pre-preg composed of four layers [0/90/90/0]. The total thickness of the sheet was approximately 0.1". The final design of the ballistic panel consisted of 39 SiC tiles adhesively bonded to a Kevlar™ sheet as illustrated in FIG. 2. The thickness and real density of the Kevlar™ and SiC are provided in Table 1.

TABLE 1

Specifications of the kevlar ™ and SiC

| Material | Thickness (in) | Areal Density (kg/m$^2$) |
| --- | --- | --- |
| Kevlar ™ | 0.1 | 2.984 |
| SiC Tile | 0.6 | 46.450 |
| Total[1] | 0.7 | 49.529 |

[1]It was assumed that the contribution of the adhesive to the total thickness and areal density of the panel was negligible.

Referring to FIG. 2, the design of an exemplary ballistic panel is shown. In the present example, the ballistic panel has hexagonal ceramic tiles adhesively bonded together as first armor material 210, and Kevlar™ sheet as second armor material 220. The first armor material 210 is adhesively bonded to the second armor material 220. The second armor material 220 is a sheet of 6 plies of Kevlar™ The Kevlar™ sheet has width 240 of about 12", length 242 of about 12", and thickness 246 of about 0.1".

The panels were laminated in a hot press after surface treatment of the ceramic tiles and the Kevlar™ panels. Efforts were made during manufacturing to maintain a uniform bondline thickness between the tiles and Kevlar™ panel, as well as a gap distance between tiles. Bondline thickness refers to the potential distance between the layer of ceramic tiles and the Kevlar™ panel, or the distance between ceramic tiles that may be occupied by for example adhesive or potential air gaps, or the like. Such bondlines may be introduced during the lamination process to bond the ceramic tiles to the Kevlar™ panels.

Example 2 Preparation of Control Ballistic Panel

In the control baseline process, a commercial thermoplastic polyurethane (TPU) adhesive was used.

The baseline procedure for ceramic ballistic panels is representative of the current industrial process. It involves solvent wipe of the tiles and Kevlar™ backing prior to bonding to remove surface contaminants. Isopropyl alcohol and acetone are commonly used solvents.

Once the surfaces of the substrate were treated, the tiles were laid down on the platen of a hot press. Edge shims were applied to minimize the gaps between the tiles. This was then followed by placing a layer of thermoplastic TPU adhesive on the tiles, and then the Kevlar™ plate on the top. Thickness shims were used to maintain the desired bondline thickness. Heat and pressure as specified by the adhesive supplier were applied.

Example 3 Preparation of TPU/Nanomaterial Adhesive Ballistic Panel

CNT-TPU composite plies of three different CNT:TPU weight ratios (up to 50 CNT wt %) were produced and tested under tensile loading (Table 1). CNT concentration of 28 wt % (16 vol. %) was chosen to fabricate CNT containing composite adhesive ply for peel tests. Each ply is around 0.010" thickness. The process of producing CNT containing adhesive was adapted from the method in Martinez-Rubi et al. [Fabrication of high content carbon nanotube-polyurethane sheets with tailorable properties, ACS Appl. Mater. Interfaces (2017) 9, 36, 30840-30849.], where a different thermoplastic polyurethane adhesive was used. Briefly, CNTs were first dispersed in methanol by sonication and, separately, TPU was dissolved in DMF. The dispersed CNTs were subsequently combined with the TPU solution, followed by additional sonication, and a nonwoven sheet of CNT-TPU was then recovered by vacuum filtration. The composition was controlled by adjusting the ratio of CNTs to TPU in solution (Table 2). By simply changing the TPU concentration in solution a broad range of compositions (i.e. CNT:TPU weight ratios) was obtained. The resulting nanocomposite sheet was a porous, non-woven fabric of TPU-coated CNTs.

TABLE 2

Composition and properties of CNT-TPU composite plies at different CNT:TPU weight ratios

| Sample | In solution CNT/TPU wt. ratio | CNT/TPU wt. ratio | Density (g/cm³) | Thickness (μm) | Volume fraction (vol. %) | | |
|---|---|---|---|---|---|---|---|
| | | | | | CNT | TPU | Void |
| MWCNT | 1:0 | 100:0 | 0.27 | 120 | 16 | 0 | 84 |
| CNPU-50 | 1:1.5 | 50:50 | 0.69 | 190 | 19 | 31 | 50 |
| CNPU-35 | 1:2.5 | 35:65 | 0.89 | 200 | 18 | 49 | 33 |
| CNPU-28 | 1:3.5 | 28:72 | 1.00 | 224 | 16 | 61 | 23 |
| TPU | 0:1 | 0:100 | 1.19 | — | 0 | 100 | 0 |

It was also recognized and determined from peel tests that CNT modified adhesive reduced surface wettability and bonding performance, potentially leading to low bond strength and likelihood of disbonding upon impact. Thus, a 5-ply laminated TPU adhesive was developed with a total thickness of around 0.025" to match with the baseline adhesive. In this 5-ply lamination, the higher percentage CNT-containing adhesive plies [e.g. CNT-TPU ply with a 35:65 weight to weight ratio] were sandwiched between pure TPU plies to ensure good adhesion while enhancing overall acoustic impedance matching. The plies were arranged as follows: ply-1 (0 wt % CNT)/ply-2 (35 wt % CNT)/ply-3 (0 wt % CNT)/ply 4 (35 wt % CNT)/ply-5 (0 wt % CNT). Other possible ply systems may also be used. For example, different number of plies such as 3-ply, 4-ply, 7-ply can be used. Furthermore, different CNT concentrations may be used for each ply. The CNT concentration of the two outer plies in contact with the substrate material for ballistic panel (ceramics and Kevlar™ in this case) can be varied to adjust adhesion level between the outer plies and the substrate material.

The 5-ply CNT-modified laminate adhesive matching [ply-1 (0 wt % CNT)/ply-2 (35 wt % CNT)/ply-3 (0 wt % CNT)/ply 4 (35 wt % CNT)/ply-5 (0 wt % CNT)] was used to bond ceramic tiles and Kevlar™ back plate as described above in Examples 1 and 2. The resulting ballistic panel is illustrated in FIG. 3. In the present example, the ceramic tiles form the first armor material 310, and the Kevlar™ sheet forms the second armor material 330. The 5-ply CNT modified laminate adhesive plies-1 to plies 5 may be similar to the five plies exemplified in FIG. 3, corresponding to the first outer ply 322a, the interior plies 324a to 324c, and the second outer ply 322b respectively. In the present example, laminated armor material has dimensions of width 340 of about 12", length 342 of about 12" and thickness 344 of about 0.7".

Example 4 Surface Treatment of Armor Material Substrates

Prior to bonding with an adhesive, it is possible to enhance adhesion of the armor material substrates such as ceramic and Kevlar™ to the adhesive by surface treatments such as Openair® plasma treatment, laser treatment, and chemical treatments. The surface treatments could allow for surface cleaning and surface activation to create strong bonds at the adhesive/substrate interface. Such surface treatments could allow for change in surface morphology and chemistry, creating stronger bonds at the adhesive/substrate interface. Each substrate material, whether it is alumina, silicon carbide, steel, aluminium or Kevlar™, responds differently to different surface treatment methods. The surface treatment method may be based on the chemical composition of the substrate, and analysis results from a range of surface and chemical characterizations such water contact angle measurement, chemical analysis such as X-ray photoelectron spectroscopy (XPS), and the like. The enhanced adhesion can assist energy transmission of the armor upon an impact event. The aforementioned surface treatments may be performed individually or combined to achieve the desired chemical bonding and mechanical interlocking.

Example 5 Multi-Hit Ballistic Test

Figure 4:
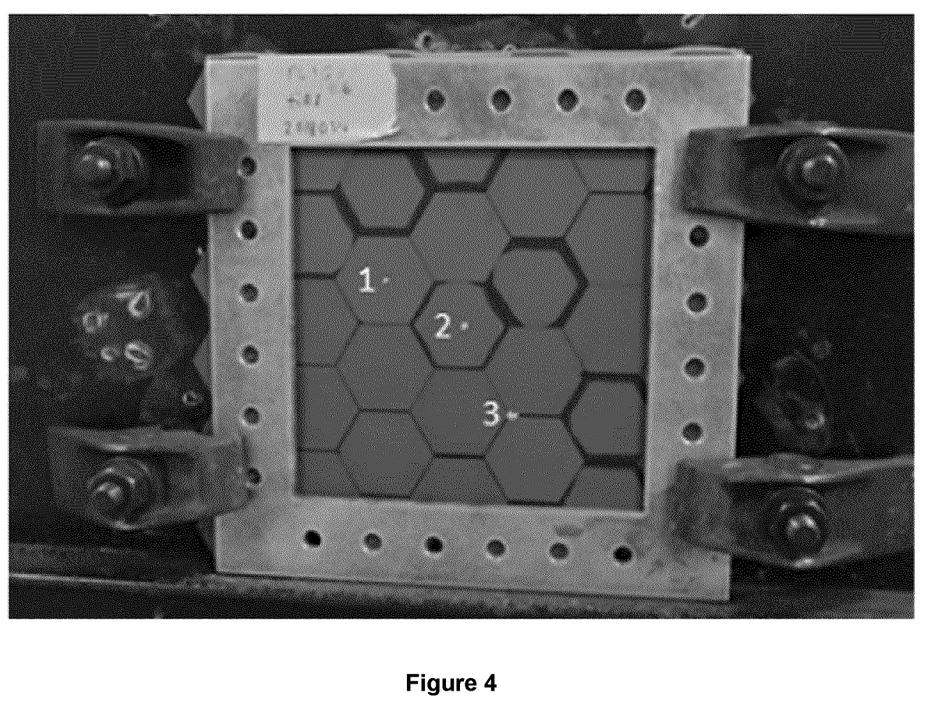
FIG. 4 shows a picture of a SiC/Kevlar™ ballistic panel clamped with a steel backing showing the three impact locations for multi-hit ballistic response testing.

Ballistic tests were performed using .30 cal. ammunition. Two groups of ballistic test panels, each comprising five to six panels, were tested. The baseline control panels are bonded with TPU adhesive after solvent wipe, while the ballistic panels of the present disclosure were bonded with laminated CNT-TPU adhesive after atmospheric pressure plasma treatment process. The bondline for all ballistic panels bonded with epoxy, TPU and CNT-TPU was maintained in the range of 0.4 to 0.54 mm. The bonded panels were clamped to a steel backing plate to resemble typical add-on armor that is bolted on the steel hull of a vehicle. Each armor panel was impacted three times with a .30 caliber bullet at projectile velocity above 900 m/s, within a range of ±15 m/s. Each panel was subjected to three shots, the first two shots were located at the center of specific tiles, and the third shot was located at specific triple point (FIG. 4). All tests were conducted at the room temperature ambient condition. FIG. 4 shows the panel before impact, where 1. and 2. indicate the locations of the two shots at the center of specific tiles, and 3. indicates the shot at triple point (intersection of three mutually adjacent tiles).

Figure 5:
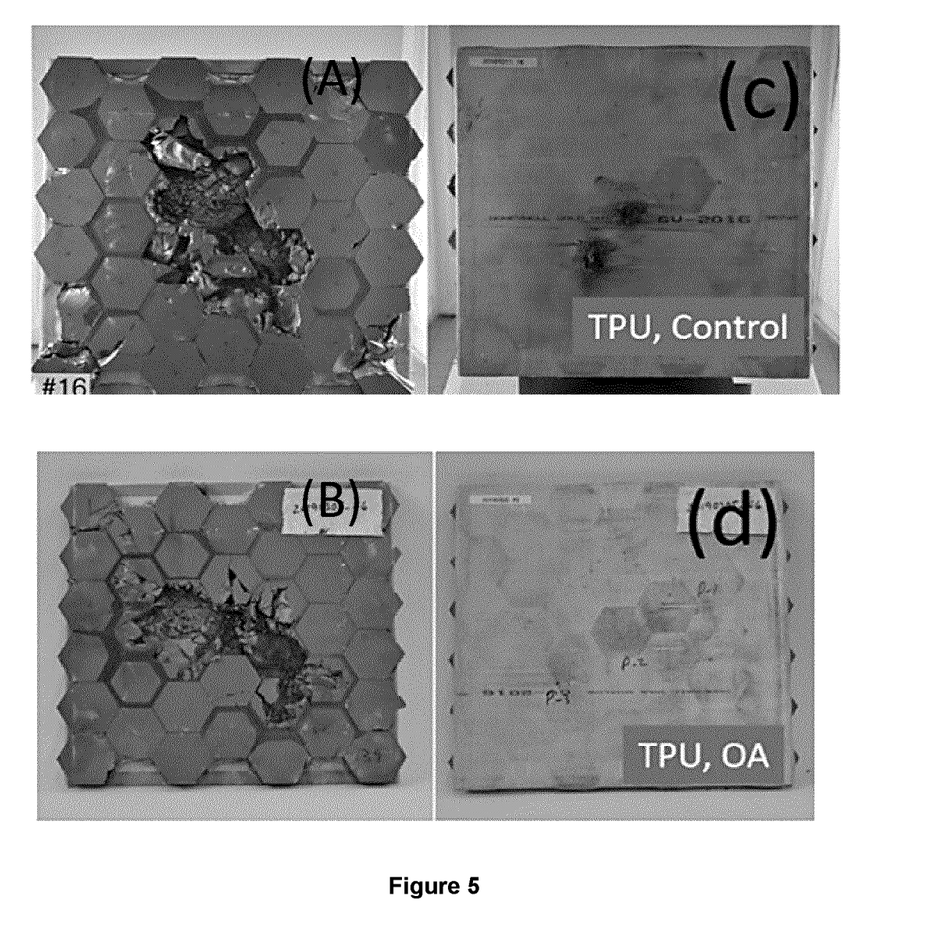
FIG. 5 shows the images of two ballistic panels after ballistic impact tests. Images A and C show the strike face and back face respectively of a TPU bonded control SiC/Kevlar™ panel, used as a control. Images B and D show the strike face and back face respectively of a bonded ballistic panel of an example of the present disclosure.

FIG. 5 shows the images of the panels' strike face and the Kevlar™ backing face following the impacts. Images A and C are the strike face and back face of a panel bonded by TPU, which is used as a control. Images B and D are the strike face and back face of the panel of Example 3 of the present disclosure. It is shown in Image C at the back of the Kevlar™ backing of the baseline control panel that the control panel was penetrated by the projectile. In contrast, Image D shows that the panel of the present disclosure using the nanomaterial filler-TPU laminated adhesive built with the same ceramic tiles and Kevlar™ had no penetration. Such an observation was consistent across the two groups of panels tested. This result shows that the laminated adhesive allowed for enhanced multi-hit performance. The laminated adhesive layer comprising nanomaterial filler allows for improved matching in acoustic impedance with the armor materials, thus facilitating energy dissipation.

Example 6 Results and Discussion

Nanotube-modified TPU laminated adhesive has been shown to enhance ballistic performance by thwarting Level III ballistic impact largely or completely. In comparison, penetration was observed on all control panels prepared using the same armor material, the same TPU adhesive with no modification and a common surface cleaning process prior to bonding.

Commercially available adhesive systems have a poor match in acoustic impedance with armor material substrates, thus hindering energy dissipation. This mismatch prevents energy transmission from the strike face to the back face, resulting in energy bounce-back at the bond interface and increased risks of disbond. Furthermore, the mismatch also hinders shockwave propagation along the in-plane direction, leading to localized stress and higher probability of penetration on the strike location. Modification using nanomaterial may improve the matching of acoustic impedance of adhesive with the armor material substrate. Acoustic impedance matching between adhesive and substrates (strike face and back face) was enhanced with the nanomaterial-modified TPU adhesive and bonding process including surface treatment such as described in Example 4. Layered laminated adhesive may offer an efficient pathway for energy to dissipate across the panel in the adhesive layer, minimizing local energy concentration. In some examples, nanomaterial fillers such as carbon nanotubes, boron nitride nanotube, graphene, nanoparticles may offer similar enhancements.

While the present disclosure has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present disclosure is found to be defined differently in a document incorporated herein by reference, the definition provided herein is to serve as the definition for the term.

The invention claimed is:

1. A laminated armor material, comprising
a) a first armor material;
b) a second armor material; and
c) a laminated adhesive layer between the first and second armor materials, wherein the laminated adhesive layer comprising:
  i. a first outer ply adjacent to the first armor material;
  ii. a second outer ply adjacent to the second armor material; and
  iii. one or more interior plies between the first and second outer plies;
wherein the first and second outer plies comprise a first thermoplastic or thermosetting adhesive,
wherein the one or more interior plies comprise a first nanomaterial filler and a second thermoplastic or thermosetting adhesive, and
wherein the first and second outer plies are each laminated to an adjacent interior ply of the one or more interior plies, and the one or more interior plies are each laminated to one or more plies adjacent to each of the one or more interior plies.

2. The laminated armor material of claim 1, wherein the first and second outer plies each independently further comprises a second nanomaterial filler at a concentration of 30 wt % or less than 30 wt %.

3. The laminated armor material of claim 2, wherein at least one of the one or more interior plies has a concentration of nanomaterial filler higher than the concentration of the second nanomaterial filler in the first and second outer plies.

4. The laminated armor material of claim 1, wherein the first thermoplastic or thermosetting adhesive and the second thermoplastic or thermosetting adhesive are each independently selected from thermoplastic polyurethane (TPU), epoxy, acrylic, and combinations thereof.

5. The laminated armor material of claim 3, wherein the first thermoplastic or thermosetting adhesive and the second thermoplastic or thermosetting adhesive are TPU.

6. The laminated armor material of claim 2, wherein the first nanomaterial filler and the second nanomaterial filler are each independently selected from carbon nanotubes, boron nanotubes, graphene, metal nanoparticles, ceramic nanoparticles, nanopowders, bulk nanostructured materials and combinations thereof.

7. The laminated armor material of claim 2, wherein the first nanomaterial filler and the second nanomaterial filler are the same.

8. The laminated armor material of claim 2, wherein the nanomaterial filler and the second nanomaterial comprise carbon nanotubes.

9. The laminated armor material of claim 5, wherein the carbon nanotubes are single-walled carbon nanotubes, multi-walled carbon nanotubes, or mixtures thereof.

10. The laminated armor material of claim 1, wherein the one or more interior plies comprise two or more interior plies.

11. The laminated armor material of claim 10, wherein the one or more interior plies comprise three interior plies.

12. The laminated armor material of claim 1, wherein the one or more interior plies each comprise greater than 0 wt % to up to 80 wt % of the first nanomaterial filler.

13. The laminated armor material of claim 12, wherein the one or more interior plies each independently comprises 10 wt % to 65 wt % of the first nanomaterial filler.

14. The laminated armor material of claim 13, wherein the one or more interior plies each independently comprises 20 wt % to 45 wt % of the first nanomaterial filler.

15. The laminated armor material of claim 1, wherein the first and second armor material are each independently selected from ceramic, metal, glass, a polymeric material and fibre reinforced polymer composites.

16. The laminated armor material of claim 15, wherein the ceramic is selected from silicon carbide, alumina, boron carbide, silicon carbide, titanium diboride ceramics and combinations thereof.

17. The laminated armor material of claim 15, wherein the metal is selected from aluminum alloy, steel, titanium alloy, and combinations thereof.

18. The laminated armor material of claim 15, wherein the polymeric material is selected from synthetic aramid, high-molecular weight polyethylene, ultra-high-molecular weight polyethylene, epoxy, phenolic, bismaleimides (BMI), and combinations thereof.

19. The laminated armor material of claim 15, wherein the first and second armor material are ceramic and synthetic aramid, respectively.

20. The laminated armor material of claim 15, wherein the fibre reinforced polymer composites are selected from carbon-fibre reinforced polymer composite, glass-fibre reinforced polymer composite, aramid-reinforced polymer composite, hybrid aramid- and carbon-reinforced polymer composite and combinations thereof.

21. The laminated armor material of claim 1, wherein the first and second armor materials each independently have one or more surfaces, and wherein at least one surface contacting the laminated adhesive layer is a treated surface and the at least one surface is treated prior to contacting the laminated adhesive layer.

22. The laminated armor material of claim 21, wherein the treated surface is solvent wiped or cleaned, abraded, plasma treated, laser treated, chemical treated, or combinations thereof.

23. The laminated armor material of claim 1, wherein the first armor material is configured to be a strike face and the second armor material is configured to be a back face.

24. A ballistic panel comprising the laminated armor material of claim 1, wherein the first armor material is laminated to the first outer ply of the adhesive layer, and the second armor material is laminated to the second outer ply of the adhesive layer, wherein the one or more interior plies are each laminated to one or more plies adjacent to each of the one or more interior plies between the first and second outer plies.

25. The ballistic panel of claim 24, wherein the first armor material and the second armor material each independently comprise one or more surfaces, and wherein at least one surface contacting the laminated adhesive layer is a treated surface and the at least one surface is treated prior to contacting the laminated adhesive layer.

26. The ballistic panel of claim 25, wherein the treated surface is independently solvent treated, abraded, plasma treated, laser treated, chemical treated, and combinations thereof.

27. A laminated impact resistant material, comprising
d) a first impact resistant material;
e) a second impact resistant material; and
f) a laminated adhesive layer between the first and second impact resistant materials, wherein the laminated adhesive layer comprising:
  iv. a first outer ply adjacent to the first impact resistant material;
  v. a second outer ply adjacent to the second impact resistant material; and
  vi. one or more interior plies between the first and second outer plies;
wherein the first and second outer plies comprise a first thermoplastic or thermosetting adhesive,
wherein the one or more interior plies comprise a first nanomaterial filler and a second thermoplastic or thermosetting adhesive, and
wherein the first and second outer plies are each laminated to an adjacent interior ply of the one or more interior plies, and the one or more interior plies are each laminated to one or more plies adjacent to each of the one or more interior plies.

28. The laminated impact resistant material of claim 27, wherein the first and second outer plies each independently further comprises a second nanomaterial filler at a concentration of 30 wt % or less than 30 wt %.

29. The laminated impact resistant material of claim 28, wherein at least one of the one or more interior plies has a concentration of nanomaterial filler higher than the concentration of the second nanomaterial filler in the first and second outer plies.

30. The laminated impact resistant material of claim 27, wherein the first thermoplastic or thermosetting adhesive and the second thermoplastic or thermosetting adhesive are each independently selected from thermoplastic polyurethane (TPU), epoxy, acrylic, and combinations thereof.

31. The laminated impact resistant material of claim 29, wherein the first thermoplastic or thermosetting adhesive and the second thermoplastic or thermosetting adhesive are TPU.

32. The laminated impact resistant material of claim 28, wherein the first nanomaterial filler and the second nanomaterial filler are each independently selected from carbon nanotubes, boron nanotubes, graphene, metal nanoparticles, ceramic nanoparticles, nanopowders, bulk nanostructured materials and combinations thereof.

33. The laminated impact resistant material of claim 28, wherein the first nanomaterial filler and the second nanomaterial filler are the same.

34. The laminated impact resistant material of claim 28, wherein the nanomaterial filler and the second nanomaterial comprise carbon nanotubes.

35. The laminated impact resistant material of claim 32, wherein the carbon nanotubes are single-walled carbon nanotubes, multi-walled carbon nanotubes, or mixtures thereof.

36. The laminated impact resistant material of claim 28, wherein the one or more interior plies comprise two or more interior plies.

37. The laminated impact resistant material of claim 36, wherein the one or more interior plies comprise three interior plies.

38. The laminated impact resistant material of claim 27, wherein the one or more interior plies each comprise greater than 0 wt % and up to 80 wt % of the first nanomaterial filler.

39. The laminated impact resistant material of claim 38, wherein the one or more interior plies each independently comprises 10 wt % to 65 wt % of the first nanomaterial filler.

40. The laminated impact resistant material of claim 39, wherein the one or more interior plies each independently comprises 20 wt % to 45 wt % of the first nanomaterial filler.

41. The laminated impact resistant material of claim 27, wherein the first and second impact resistant materials are each independently selected from ceramic, metal, glass, a polymeric material and fibre reinforced polymer composites.

42. The laminated impact resistant material of claim 41, wherein the ceramic is selected from silicon carbide, alumina, boron carbide, silicon carbide, titanium diboride ceramics and combinations thereof.

43. The laminated impact resistant material of claim 41, wherein the metal is selected from aluminum alloy, steel, titanium alloy, and combinations thereof.

44. The laminated impact resistant material of claim 41, wherein the polymeric material is selected from synthetic aramid, high-molecular weight polyethylene, ultra-high-molecular weight polyethylene, epoxy, phenolic, bismaleimides (BMI), and combinations thereof.

45. The laminated impact resistant material of claim 41, wherein the first and second impact resistant material are ceramic and synthetic aramid, respectively.

46. The laminated impact resistant material of claim 41, wherein the fibre reinforced polymer composites are selected from carbon-fibre reinforced polymer composite, glass-fibre reinforced polymer composite, aramid-reinforced polymer composite, hybrid aramid- and carbon-reinforced polymer composite and combinations thereof.

47. The laminated impact resistant material of claim 27, wherein the first and second impact resistant materials each independently have one or more surfaces, and wherein at least one surface contacting the laminated adhesive layer is a treated surface and the at least one surface is treated prior to contacting the laminated adhesive layer.

48. The laminated impact resistant material of claim 47, wherein the treated surface is solvent wiped or cleaned, abraded, plasma treated, laser treated, chemical treated, or combinations thereof.

49. The laminated armor material of claim 27, wherein the first impact resistant material is configured to be a strike face and the second impact resistant material is configured to be a back face.

50. A ballistic panel comprising the laminated impact resistant material of claim 27, wherein the first impact resistant material is laminated to the first outer ply of the adhesive layer, and the second impact resistant material is laminated to the second outer ply of the adhesive layer, wherein the one or more interior plies are each laminated to one or more plies adjacent to each of the one or more interior plies between the first and second outer plies.

51. The ballistic panel of claim 50, wherein the first impact resistant material and the second impact resistant material each independently comprise one or more surfaces, and wherein at least one surface contacting the laminated adhesive layer is a treated surface and the at least one surface is treated prior to contacting the laminated adhesive layer.

52. The ballistic panel of claim 51, wherein the treated surface is independently solvent treated, abraded, plasma treated, laser treated, chemical treated, and combinations thereof.

* * * * *